United States Patent [19]

Roggendorff

[11] Patent Number: 4,696,262
[45] Date of Patent: Sep. 29, 1987

[54] AIR-COOLED INTERNAL COMBUSTION ENGINE

[75] Inventor: Martin Roggendorff, Cologne, Fed. Rep. of Germany

[73] Assignee: Kloeckner-Humboldt-Deutz AG, Fed. Rep. of Germany

[21] Appl. No.: 820,941

[22] Filed: Jan. 21, 1986

[30] Foreign Application Priority Data

Jan. 26, 1985 [DE] Fed. Rep. of Germany ....... 3502668

[51] Int. Cl.$^4$ ................................................ F01P 1/02
[52] U.S. Cl. ........................... 123/41.69; 123/193 CH
[58] Field of Search ................ 123/41.56, 41.58, 41.6, 123/41.69, 41.7, 193 CH

[56] References Cited

U.S. PATENT DOCUMENTS 1,943,502  1/1934  Woolson ........................... 123/41.69
2,191,050  2/1940  Trice ................................ 123/41.69

FOREIGN PATENT DOCUMENTS 3415495  10/1985  Fed. Rep. of Germany ... 123/41.56
59115    9/1941   Sweden ............................ 123/41.69

Primary Examiner—William A. Cuchlinski, Jr.
Attorney, Agent, or Firm—Charles L. Schwab

[57] ABSTRACT

An air-cooled internal combustion engine is provided with a horizontal partition or wall near the juncture between the cylinder and the cylinder head to obtain a flow of cooling air past the cylinders beneath the partition to heat the driver's area. The partition provides a gas-tight separation of the air directed to the driver's area from the cooling air passing over and around the cylinder head. By using the disclosed partition arrangement in the air-cooled engine of a self-propelled vehicle, combustion gases escaping through a leaky cylinder head gasket will not be mixed with the warmed air used to heat the driver's area.

13 Claims, 4 Drawing Figures

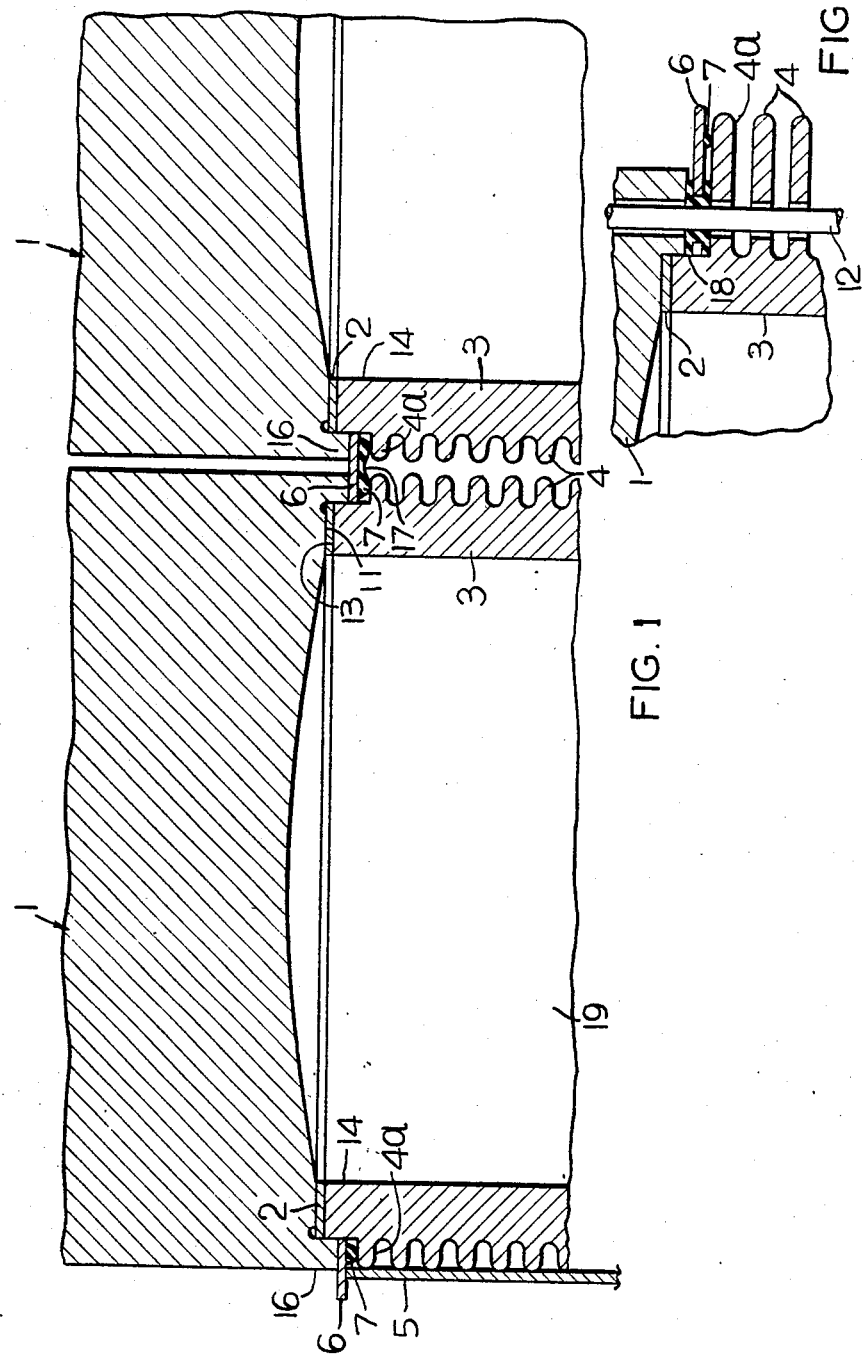

AIR-COOLED INTERNAL COMBUSTION ENGINE

This invention relates to an air-cooled internal combustion engine wherein air conducted past the engine cylinders is available to heat the driver's area of a vehicle in which the engine is used.

PRIOR ART STATEMENT

Heretofore, the cooling air provided to cool air-cooled internal combustion engines is also used to provided heating after it has been warmed up as it is conducted past the cylinder and the cylinder head. The Lloyd twin-cylinder four-stroke engine, for example, uses this kind of warmed-up cooling air for heating the driver's compartment. However, in such a "prior art" system, the heating air frequently becomes contaminated by oil mist and combustion gases passing into the warmed-up cooling air. A particular cause of this contamination entering the flow of cooling air is a leaky cylinder head gasket. In order to avoid this problem, a supplementary heat exchanger is installed in the air-cooled four-cylinder double-piston engine of the Volkswagon "Beetle" automobile to provide heating air separate from the warmed-up cooling air.

OBJECTS AND SUMMARY OF THE INVENTION

It is an object of this invention to provide a simple means to route the cooling air which flows past the cylinders of an air-cooled internal combustion engine directly to the driver's area to provide heating without contamination from engine combustion gases such as may escape from a leaky cylinder head gasket.

It is a further object to provide a single gas-tight partition in a multi-cylinder air-cooled engine of the type having a plurality of separately formed cylinder and cylinder head units, whereby the cooling air, which is warmed as it flows past the cylinders, is separate from the other engine cooling air and flows to the driver's area without being contaminated in the process, even in the event of a combustion gas leak between the cylinder head and the cylinder.

It is preferable that the partition of this invention designed for use between the cylinders and the cylinder heads of a multi-cylinder-bank internal combustion engine be made of a metallic material such as, for example, a metal plate. The partition is provided with an opening for each cylinder which corresponds to the outer contour of the upper end of the associated cylinder. The opening permits the partition to be fitted over the upper end of the cylinder and brought into sealing engagement with the uppermost radially extending cooling fin of the cylinder before installation of the cylinder head. In order to establish a gas-tight seal around the opening for the cylinder, an elastic seal is provided between the partition and the uppermost cooling fin which deforms on installation to form a seal which is gas-tight at every point of its encircling path around the cylinder. The elastic seal preferably is vulcanized or bonded to the underside of the partition and has a semicircular section profile in its unstressed noninstalled condition. Indentations may be provided in the cylinder openings of the partition for receiving sealing elements for tie rods securing the cylinder head and the associated cylinder to the crank case so as to seal the tie rod relative to the uppermost cooling fin of the associated cylinder. The partition preferably extends outwardly over a cooling air shroud surrounding the cylinders and the cylinders and the shroud are substantially perpendicular to the partition. The partition, as herein described, is effective to prevent exhaust gases, which would escape in the event of a leak between the cylinder head and cylinder, from entering the flow of cooling air which is used for heating the driver's area.

BRIEF DESCRIPTION OF THE DRAWINGS

One embodiment of the invention is shown in the drawings, in which:

FIG. 1 is a partial vertical section of two cylinder units of an engine on which the partition of this invention is installed;

FIG. 2 is a view taken along the line II—II in FIG. 3 showing a tie rod and its sealed relationship with the upper cooling fin of the associated cylinder;

DETAILED DESCRIPTION OF THE INVENTION

Figures 3, 4:
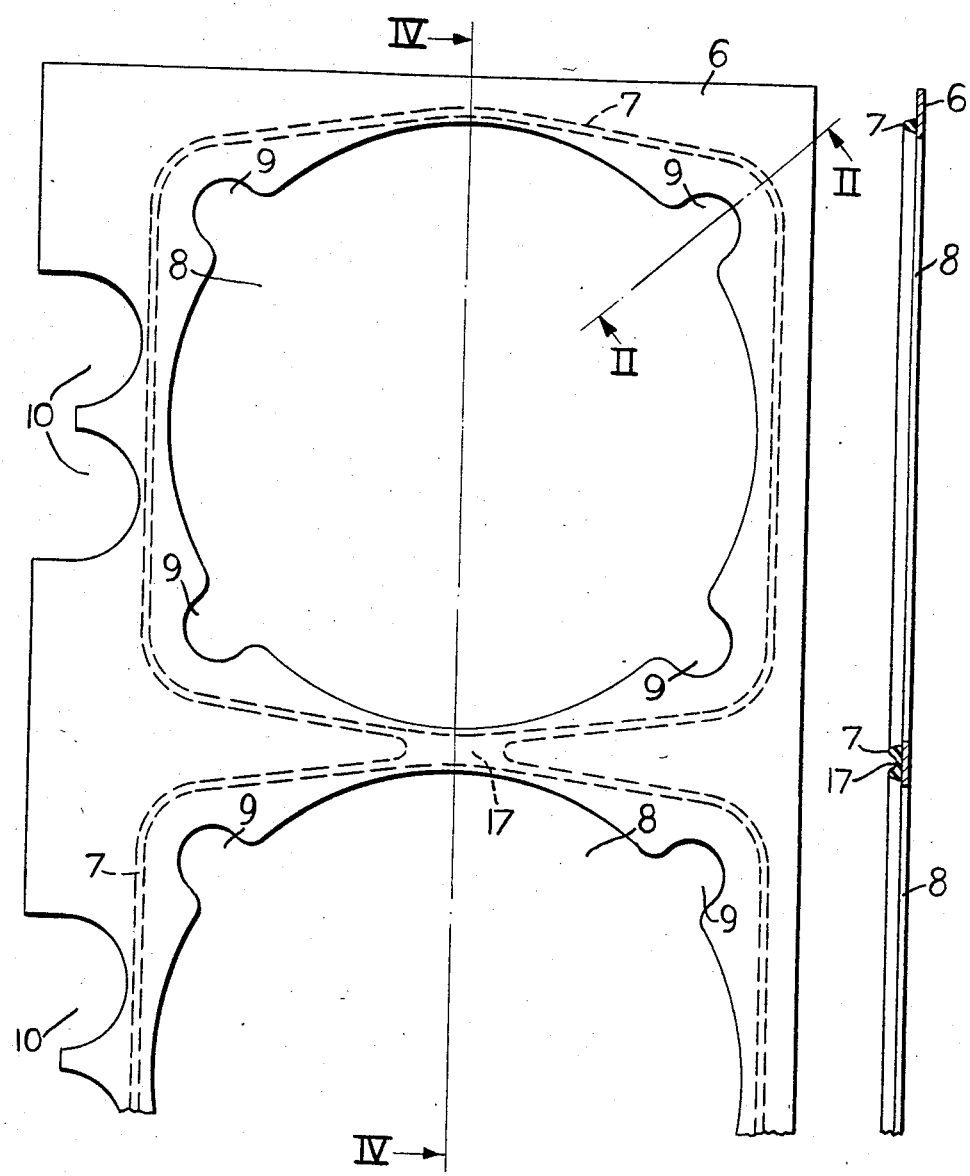
FIG. 3 is a partial top plan view of the partition shown in FIG. 1.
FIG. 4 is a view taken along the line IV—IV in FIG. 3.

FIGS. 1 and 2 of the drawings show parts of two side-by-side cylinder units of an air-cooled internal combustion engine. Each cylinder unit includes a cylinder head 1 and a cylinder 3. Each cylinder head 1 of the bank of cylinder units has an annular flat shoulder surface 11 which is held in sealed relation with the upper end of its associated cylinder 3 by a plurality of tie rods 12, only one of which is shown. The tie rods 12 are connected at their lower end to the engine crank case, not shown, and at their upper end to the cylinder head 1. A conventional cylinder head gasket 2 is installed between the surface 11 and the flat annular surface 13 of the flanged upper end 14 of the cylinder 3 to provide a gas-tight seal. The cylinder head includes a flange 16 which extends downwardly below the shoulder surface 11 and in outboard lapped relation to the upper end 14 of the cylinder 3 so as to encompass it.

The bank of side-by-side cylinders 3 are provided with vertically spaced and radially extending cooling fins 4 along their exteriors which are surrounded by an upright cooling baffle or shroud 5. A special horizontal dividing wall or partition 6 is positioned between cylinder heads 1 and cylinders 3 near their plane of juncture. The partition 6 is provided with openings 8 which correspond to the cylindrical outer contour of the upper end 14 of each cylinder 3 in the area of its flanged coupling with its corresponding cylinder head 1. The common partition 6 is pushed over the upper end or flange part 14 of each cylinder 3 so as to rest on the uppermost cooling fin 4a. In order to maintain a gas-tight seal between the partition 6 and the cylinder 3, an elastic seal 7 is vulcanized onto the partition 6. This extends, as can be seen in FIG. 3, in a closed quadrate loop or square configuration around the opening 8. The elastic seal 7 extends around the entire circumference of each cylinder 3 and engages the top surface of the uppermost cooling fin 4a. The predetermined thickness of the elastic seal 7 is selected to ensure that when the cylinder head is installed, the partition fits securely between and sealingly engages the cylinder head 1 and cylinder 3 under all operating conditions of the internal combustion engine. The partition 6 extends laterally out over the upright cooling shroud 5 and sealingly engages it. In the event of a leak in the cylinder head gasket 2, the exhaust gases which escape from the combustion chamber 19 cannot mix with the cooling air which flows around cylinders 3 en route to the driver's area, not shown, of the vehicle in which the engine is used.

Referring to FIGS. 3 and 4, the common partition 6 is shown in a non-installed condition. The partition 6 is generally rectangular in shape, a shape which is only interrupted at its periphery or edge by indentations 10. The valve operating push rods, not shown, extend through these indentations 10 and sealing bushings, not shown, are used to prevent movement of cooling air between the top and bottom sides of the partition by way of the indentations 10. Circumferentially spaced indentations 9 for accommodating the tie rods 12 are provided at the edge of openings 8 of the partition 6. The indentations 9 lie within the arc encircled by the seal 7. The tie rods 12, which connect the cylinder head 1 and the cylinder 3 with the internal combustion engine crank case, are sealed in relation to the uppermost cooling fin 4a by elastic seals 18 each of which has an opening for receiving a tie rod. The annular seal 18 has an outer groove permitting it to be pushed into an indentation 9. The elastic seals 7 are vulcanized to the underside of the partition 6 and are connected to each other at 17 as can be seen in FIGS. 1 and 3. In the noninstalled condition of the partition 6, the seal 7 has a semicircular section profile.

When an air-cooled engine incorporating this invention is used in a vehicle having an operator's station or compartment, the partition 6 provides a gas-tight separation or division of engine cooling air so that the cooling air passing beneath the partition and warmed up by the cylinders will not be contaminated by combustion gases in passing to the driver's area. The partition 6 is located below the plane of juncture between the cylinder heads 1 and cylinders 3 and, thus, any combustion gases escaping from the juncture because of a leaky cylinder head gasket 2 will not pass into the warmed air used to heat the driver's area. The elastic seal 7 is sufficiently pliable to accommodate dimensional tolerances and to conform to and sealingly engage the upper surface of the uppermost cooling fin 4a. By bonding the seal 7 to the partition 6 and by pushing the grommet shaped seals 18 into the indentations 9 before assembly, a preassembled partition 6 is made available to the assembler. Thus, sealing elements will not be forgotten during assembly of the cylinder 3 and cylinder head 1 with the partition 6 of this invention.

The embodiments of the invention in which an exclusive property or privilege is claimed are defined as follows:

1. In an air-cooled internal combustion engine having at least one cylinder unit including a cylinder and a cylinder head on top of and in a sealing juncture with the cylinder, means for conducting cooling air past the cylinders of the engine to facilitate its use as heating air including a generally flat partition near the plane of said sealing juncture between said cylinder head and said cylinder, said partition being gas-tight sealing engagement with said cylinder independently of said sealing juncture whereby cooling air flowing beneath said partition and past said cylinder will not be contaminated by combustion gases leaking from said sealing juncture between said cylinder and said cylinder head.

2. The air-cooled internal combustion engine of claim 1 wherein said cylinder has a plurality of vertically spaced cooling fins extending radially outward therefrom, the uppermost of said cooling fins being spaced a predetermined distance below the upper end of said cylinder and below said plane of juncture, and further comprising an elastic seal between and sealingly engaging said partition and said uppermost fin, said seal encircling said cylinder.

3. The air-cooled internal combustion engine of claim 2 wherein said partition includes an opening through which said upper end of said cylinder extends, said opening including a plurality of circumferentially spaced indentations for receiving tie rods for securing said cylinder head and said cylinder to said engine and wherein said indentations lie within the area encircled by said seal.

4. The air-cooled internal combustion engine of claim 3 and further comprising a sealing member in each of said indentations for sealing the tie rod extending therethrough in relation to said uppermost cooling fin of said cylinder.

5. The air-cooled internal combustion engine of claim 4 and further comprising an upright shroud laterally outward of said cylinder having a top edge in sealing engagement with the underside of said partition.

6. The air-cooled internal combustion engine of claim 1 wherein said engine includes a plurality of side-by-side cylinder units and wherein said partition is disposed below the sealing juncture of said cylinders and said cylinder heads of said plurality of cylinder units.

7. The air-cooled internal combustion engine of claim 6 wherein each of said cylinders has a plurality of radially extending cooling fins spaced along its exterior with the uppermost fin being spaced below the upper end of the cylinder, wherein each of said cylinder heads includes a flat shoulder surface in sealing relation with the upper end of its associated cylinder and a flange which extends downwardly in relation to said shoulder surface and encompasses said upper end of said cylinder, wherein said partition has openings corresponding to the outer contour of the upper ends of said cylinders permitting said partition to be pushed onto said cylinders and into sealing relation with the uppermost fins of said cylinders.

8. The air-cooled internal combustion engine of claim 7 and further comprising an upright shroud laterally outward of said cylinders having a top edge in sealing engagement with the underside of said partition.

9. The air-cooled internal combustion engine of claim 7 wherein said partition includes an elastic seal vulcanized to said partition, said seal engaging said uppermost fins around the said cylinders.

10. The air-cooled internal combustion engine of claim 7 wherein said openings in said partition include indentations for accommodating tie rods and including sealing elements in said indentations for sealing said tie rods relative to the uppermost fins of said cylinders.

11. The air-cooled internal combustion engine of claim 6 wherein each of said cylinders has radially extending cooling fins including an uppermost cooling fin and wherein said partition includes an elastic seal engaging said uppermost fins of said cylinders.

12. The air-cooled internal combustion engine of claim 11 wherein said elastic seal has a semicircular section profile in unstressed condition.

13. The air-cooled internal combustion engine of claim 12 wherein said elastic seal extends in a closed quadrate loop around said cylinder.

* * * * *